United States Patent [19]
Jonsson

[11] 3,835,901
[45] Sept. 17, 1974

[54] TREE FELLING DEVICE

[76] Inventor: Karl-Erik A. Jonsson, Floraplan 14, 802 28 Gavle, Sweden

[22] Filed: Nov. 13, 1973

[21] Appl. No.: 415,395

[30] Foreign Application Priority Data
Dec. 11, 1972 Sweden.............................. 16099/72

[52] U.S. Cl.................... 144/34 R, 83/523, 83/796, 83/835, 144/2 N, 144/3 D
[51] Int. Cl............................................ A01g 23/08
[58] Field of Search ............ 83/523, 795, 796, 835, 83/928; 144/2 N, 3 D, 34 R, 34 B, 34 E, 309 AC

[56] References Cited
UNITED STATES PATENTS

| | | | |
|---|---|---|---|
| 1,507,460 | 9/1924 | Carroll......................... | 144/34 R X |
| 1,509,994 | 9/1924 | Carroll....................... | 144/34 R UX |
| 3,540,501 | 11/1970 | Jonsson............................ | 144/34 E |

FOREIGN PATENTS OR APPLICATIONS

| | | | |
|---|---|---|---|
| 330,602 | 3/1971 | Sweden........................ | 144/309 AC |

*Primary Examiner*—Andrew R. Juhasz
*Assistant Examiner*—W. D. Bray
*Attorney, Agent, or Firm*—Wenderoth, Lind & Ponack

[57] ABSTRACT

A rotary saw ring formed as an annular segment of a spherical bowl and adapted to be swung around the centre of an imagined sphere, in which said segment ring is included.

9 Claims, 14 Drawing Figures

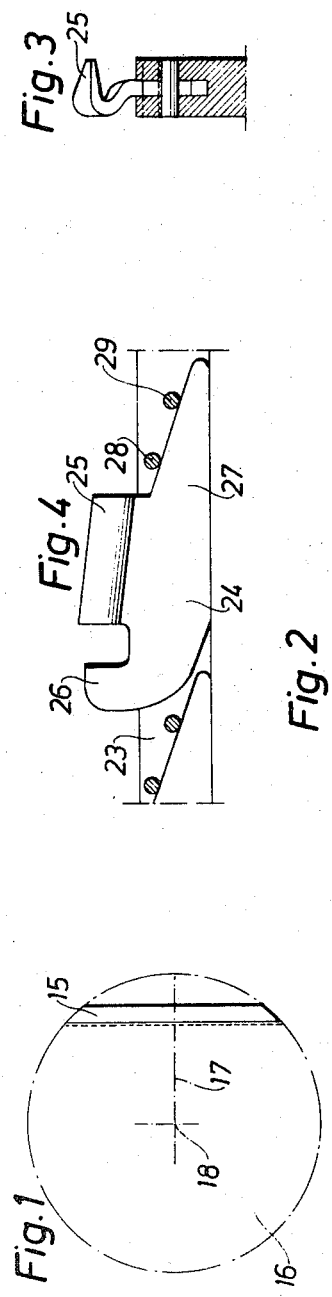

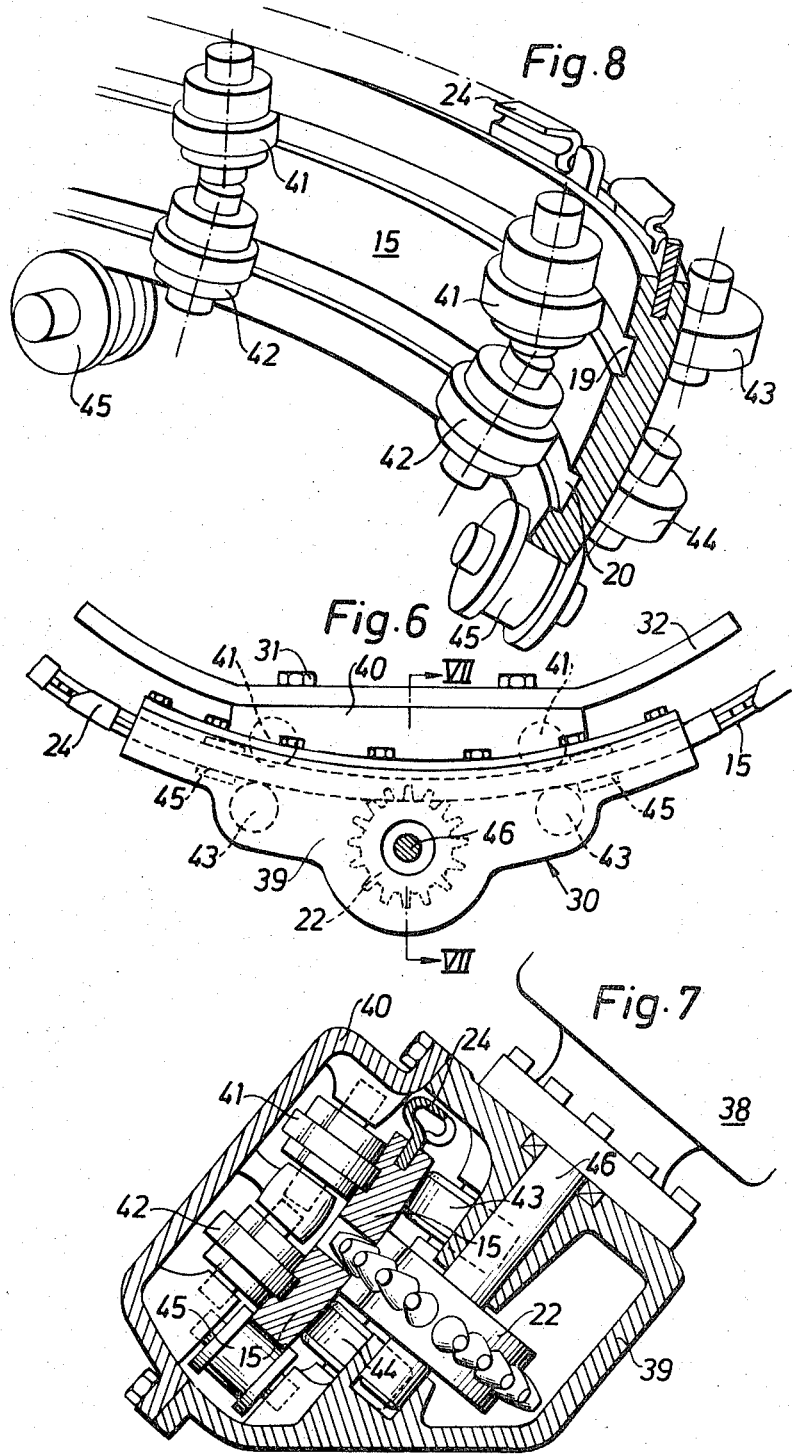

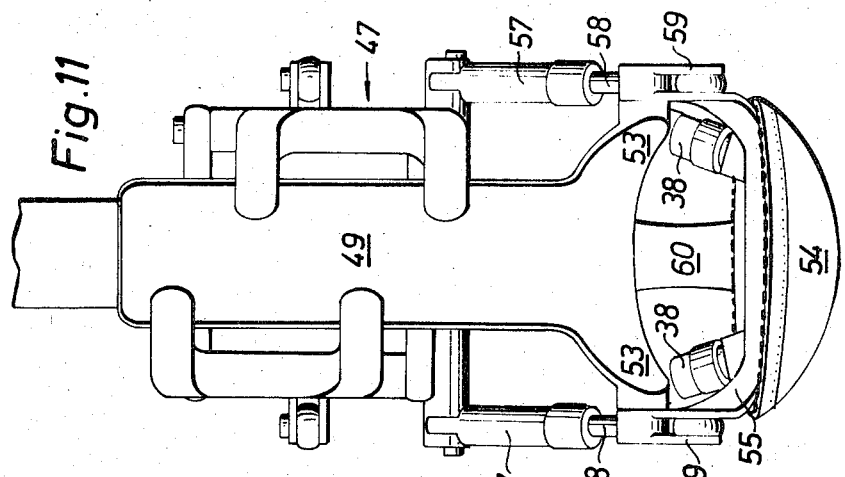
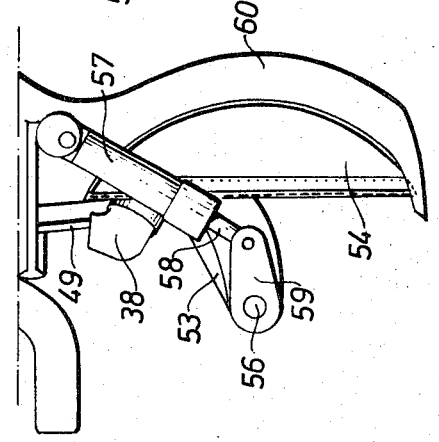
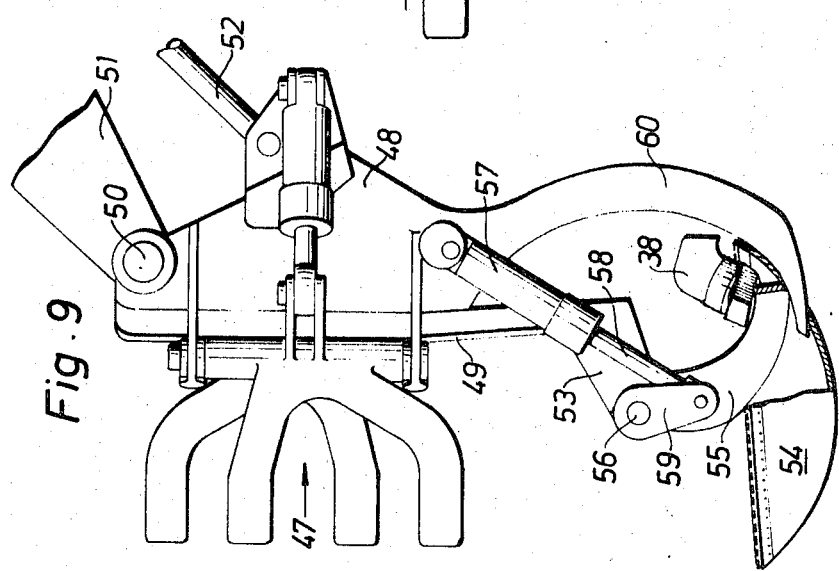

TREE FELLING DEVICE

BACKGROUND OF THE INVENTION

The invention relates to a tree felling device of the type intended to be suspended in a crane beam carried by a vehicle.

Tree felling means previously known operate with either cutting knives or sawing members. A cutting mechanism described in the U.S. Pat. No. 3,540,501 has two curved knife blades movable to and fro each other in such a way that, when felling a tree, the remaining stump will get a bowl-shaped section surface. This device has the advantage that the tree can be cut close to the ground, whereby an increased amount of valuable wood is saved. On the other hand, cutting knives have sometimes the inconvenience that the trunk is splintered longitudinally at its cut end, which then means a loss of wood of good quality.

SUMMARY OF THE INVENTION

The invention has for its object to provide a tree felling device operating with saw teeth but nevertheless giving the same advantages as the knife mechanism described in said U.S. Pat., though the inconveniences of said prior mechanism are eliminated. For that purpose, an annular segment of a spherical bowl is, along its greater periphery, provided with saw teeth forming a continuation of the bowl profile and having their cutting edges directed peripherically. Further, means are provided to rotate the ring around its axis, and means are also provided to give said ring a limited angular motion around the centre of the imagined sphere, in which the ring is included. The angular motion may take place around an axis extending through said centre at an angle of 45°–90° to the axis of rotation, preferably at an angle of about 90°.

Before operation the saw ring is preferably held in a vertical plane, and in this position the ring is advanced onto the tree to be felled. While rotating around its axis the ring is then caused to swing about a quarter of a revolution downwards onto and through the tree which will thus be sawed through. The remaining stump has a bowl-shaped section surface.

Tree felling devices operating with saw chains have hither-to required a rather large space in a horizontal plane next to the tree to be felled, and therefore it has often been necessary to make the cut at a level well above the ground. Contrary to this, the new device may practically always be operated such that the tree is cut quite close to the ground or sometimes even a little lower, in that the bottom of the bowl-shaped surface of the stump may lie at a lower level than the ground. Especially when felling thick trees such a course of action will result in a valuable gain of wood.

DETAILED DESCRIPTION OF PREFERRED EMBODIMENTS

The invention will be further described hereinafter with reference to the enclosed drawings which show two different embodiments. In the drawings:

FIG. 1 is an outline diagram intended to explain the basic idea of the invention;

FIG. 2 is a perspective view of a saw ring made according to the invention;

FIG. 3 shows a cross section through the wider portion of the ring;

FIG. 4 is a side view of a saw tooth mounted in a corresponding groove in the ring;

FIG. 6 shows the holding and driving means of the saw ring, as seen from above;

FIG. 7 is a cross section on lines VII—VII in FIG. 6;

FIG. 8 shows diagrammatically a perspective view of some parts of a mechanism for guiding the saw ring;

FIGS. 9 and 10 show diagrammatically side views of another embodiment in two different operating positions, though only the lower portion of the device is shown in FIG. 10;

FIG. 11 shows a front view of the device in FIG. 9;

Figure 5:
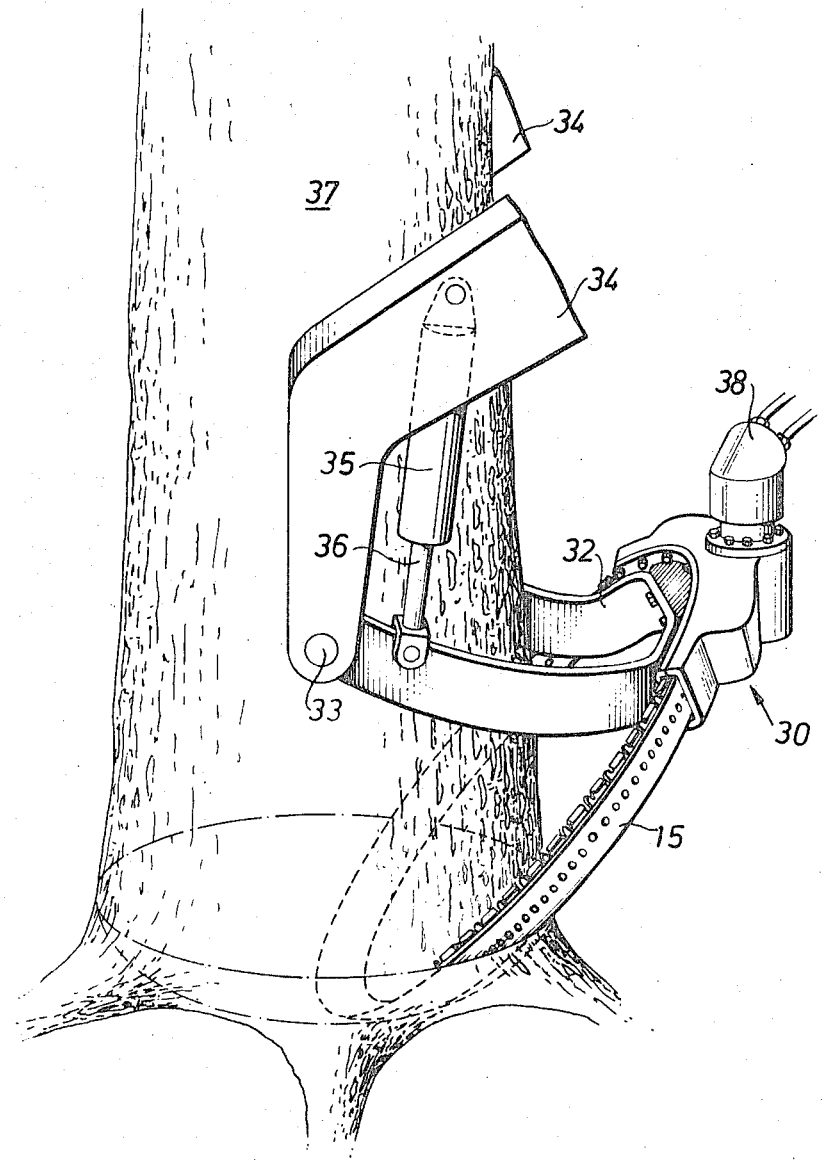
FIG. 5 is a perspective view of a tree felling device provided with the saw ring in FIG. 2 and shown in an operative position when felling a tree.

As is shown diagrammatically in FIG. 1, the saw ring 15 consists of an annular segment of a spherical bowl or of a spherical shell 16, and the ring 15 must be rotatable around its axis 17 as well as swingable in a plane around the centre 18 of a sphere 16, in which said ring is included. To cut through a tree it is generally quite sufficient, if the ring 15 can be swung downwards at an angle of about 90° from the position in FIG. 1, where the axis 17 of the ring is horizontal. In other words, the ring 15 is moved such that its axis 17 will be about vertical, and during this movement the saw ring cuts a bowl-shaped section through the trunk, as is indicated by dashed and dotted lines in FIG. 5.

The saw ring 15 is shown on a larger scale in FIG. 2, where a guiding and driving mechanism is indicated diagrammatically only. As an example, the ring may be made of a steel band having a thickness of about 15–20 mm. At its inner side the ring has two peripheral guide grooves 19 and 20, and between these grooves a plurality of bores 21 is arranged in a peripheral row to be engaged by a tooth wheel 22 which is journalled in a ring holder and driven by a motor.

The end face at the wider end of the ring 15 has a rather deep peripheral groove 23 to receive saw teeth 24 which may be of the same kind as those used in saw chains, i.e., the cutting portions 25 of the teeth are bent at about right angles alternately inwards and outwards (FIGS. 2–4). In cross section (FIG. 3) the teeth 24 have a width substantially corresponding to the thickness of the ring 15, so that the latter can penetrate into a cutting made by the teeth. In the known way, each tooth 24 is formed with a rider lug 26 (FIG. 4) placed a little before the cutting portion 25, as seen in the intended direction of rotation of the ring 15. Also, FIG. 4 shows a simple mounting of the teeth in the groove 23. Thus, each tooth 24 may have a wedge-shaped trailing end portion 26 dimensioned to be introduced below two pins 28 and 29, which extend crosswise through the groove 23. The mounting functions in such a way that the tooth will be still more wedged up when subjected to working pressure.

As appears from FIG. 5, the saw ring 15 described above has a short sector (45°–90°, for instance) inserted in an arcuate holder 30 which will be described below. The holder 30 is by means of bolts 31 (see also FIG. 6) secured to the central portion of a U-shaped yoke 32, and the ends of this yoke are by means of aligned pivots (only one pivot 33 is visible in FIG. 5) connected each to one leg of a fork 34 being the outer portion of a crane beam, not further shown. According to the invention, the common axis of the pivots 33 extends through the centre of an imagined sphere, in which the ring is included as a segment.

The yoke 32 may be swung in relation to the fork 34 by means of two hydraulic cylinders. Only one cylinder 35 and its piston rod 36 are visible in FIG. 5. Generally, the crane beam also carries a pair of grasping claws (not shown) adapted to grasp and hold the tree during the cutting. In FIG. 5, the device is shown while the felling of a tree 37 is going on, and the saw ring 15 driven by a motor 38 has thus been swung downwards by the jacks 35 to cut through the trunk. As is obvious from FIG. 5, the saw cut may easily be located at such a low level that the bowl-shaped end surface of the remaining stump will lie about at the level of the ground.

The ring holder 30 also carrying the driving motor 38 is shown in more detail in FIGS. 7 and 8. It may be said to consist of an arcuate casing or sleeve enclosing a short section of the ring 15. The casing may be composed of two cap-like parts 39 and 40 placed at the outside and inside of the ring, respectively, and held together by bolts. Within said casing the ring 15 passes between a plurality of rollers which engage both sides of the ring as well as the lower edge of the ring. Thus, two or more pairs of rollers 41, 42 journalled in the inner cap 40 are adapted to engage the guide grooves 19 and 20, respectively, at the inner side of the ring, and two or more pairs of rollers 43, 44 journalled in the outer cap 39 engage the outside of the ring to serve as counter supports. The pairs of rollers are placed in spaced relationship along the enclosed section of the ring, so that the ring is firmly held and guided. Moreover, the lower edge of the ring 15 (i.e., the edge opposite to the teeth carrying edge) is supported by a row of flanged rollers 45 having their shaft ends journalled in the outer and inner holder parts 39 and 40, respectively.

The outer part 39 of the ring holder 30 is also formed with a bearing for a shaft 46 carrying the tooth wheel 22 which engages the row of bores 21 to rotate the ring 15 around its axis. The shaft 46 is connected to the hydraulic rotary motor 38 mounted on the holder 30, and in this way the ring 15 may be rotated at a desired speed.

The embodiment shown in FIGS. 9–14 differs from the device described above primarily by that the saw ring constitutes the outermost segment of a spherical bowl which is suspended in a crane beam. Thus the saw ring is here rotatably journalled at the edge of a supporting bowl entirely filling the central opening of said ring. This embodiment has the advantage that the bowl may serve to support the felled tree at its hoisting and transportation away from the remaining stump. A further advantage is a more simple guiding of the saw ring during the operation.

In FIGS. 9–11, the tree felling device is mounted on a frame also carrying a grasping mechanism 47 known in per se and therefore not here described. The frame is composed of a rear and a fore part 48 and 49, respectively. The rear part 48 is by means of a pivot 50 suspended in a crane beam 51, and a hydraulic cylinder, not shown, is linked to said beam 51, while its piston rod 52 is linked to the support 48 (FIG. 9). The fore part 49 of the frame consists of a plate elongated in vertical direction and a little chute-shaped in cross section. This plate 49 is intended to be brought into contact with a trunk, before it is gripped by the grasping mechanism 47. The lower end portion of the plate 49 is widened to form a semi-circular fork having two legs 53, in which the bowl 54 described below is suspended. For that purpose, a U-shaped yoke 55 has its central portion secured to the inside of the bowl 54 near the rear edge of said bowl, while the ends of the yoke are linked to the legs 53 of the plate 49 by means of aligned pivots 56. The common axis of said pivots 56 is perpendicular to the symmetry axis of the bowl 54, i.e., the axis of rotation of the saw ring, and it extends through the centre of the imagined sphere in which the bowl 54 constitutes a segment. The bowl may be swung in the plane of the drawing in FIG. 1 by means of two hydraulic cylinders 57 linked to the frame part 48. The piston rods 58 of said cylinders are linked to two arms 59 which are secured to the ends of the yoke 55. With regard to the attachment of the yoke at the inside of the bowl it must be observed that the diameter of the bowl is considerably larger than the maximum thickness of a tree to be cut by the device.

FIGS. 9 and 11 show the device in a position, where the bowl 54 has been moved downwards, so that the saw ring is about horizontal. This is the position of the bowl when a tree has been cut through. In FIG. 10, the bowl 54 has been moved upwards to an inoperative position, i.e., the position before a sawing operation, and in this position the bowl is at least partly protected against bumps by means of an arcuate member 60 which extends downwards from the rear frame part 48 and is designed such that it embraces the lower portion of the bowl.

Figure 14:
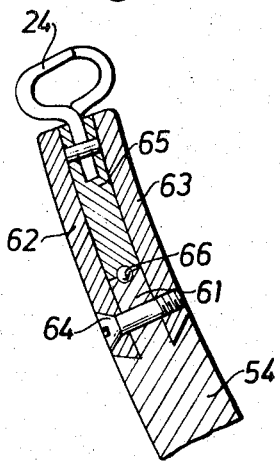
FIG. 14 shows, in a larger scale, a cross section through the saw ring and its guiding means in the embodiment shown in FIGS. 9–13.
Figure 12:
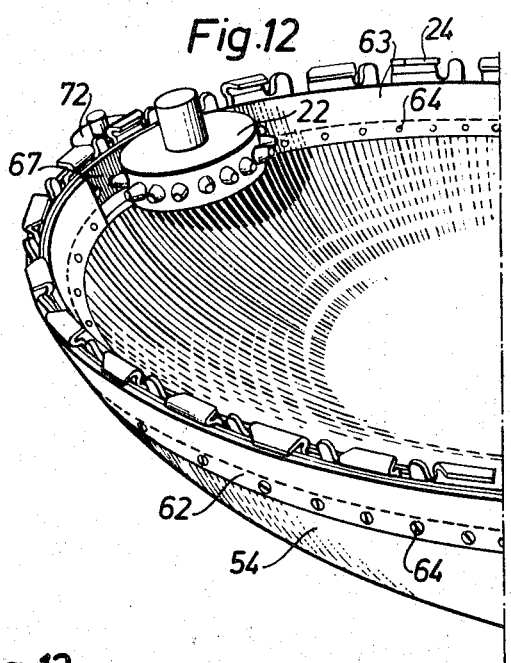
FIG. 12 shows, in a larger scale, a perspective view of a fraction of the embodiment in FIGS. 9–11.

As appears from FIG. 14, the edge portion of the bowl 54 is turned down internally as well as externally, so that a thin wall section 61 only is left next to the edge. Metal rings 62, 63 adapted to the curvature of the bowl are fit in the recesses thus formed on both sides of the wall section 61 and secured by screws 64. The rings 62, 63 have such a width that they define a rather deep groove outside the end surface of the thin wall section 61, and a saw ring 65 is slidably inserted in this groove. The friction between the saw ring 65 and the end surface of the wall section 61 may be reduced by a peripheral row of balls 66 or some other kind of ball bearing. The outer end surface of the saw ring 65 has a peripheral groove in which the saw teeth 24 are mounted. The teeth may be wedged up as described with reference to FIG. 4, or they may be secured by means of rivets. From FIG. 14 it may also be seen, that the teeth 24 must have a width at least equal to the thickness of the wall of the bowl 54.

In the same way as described in connection with the first embodiment, the saw ring 65 may be rotated by a hydraulic rotary motor 38 connected to a tooth wheel 22 (FIG. 13), which engages a row of bores in said ring 65. To make such an engagement possible the inner guide ring 63 must be provided with an elongated opening 67 opposite to the driving wheel 22, as especially appears from FIG. 12. Preferably two such driving mechanisms may be placed in spaced relationship at the rear edge of the bowl 54, as is indicated by two hydraulic motors 38 in FIG. 11.

Figure 13:
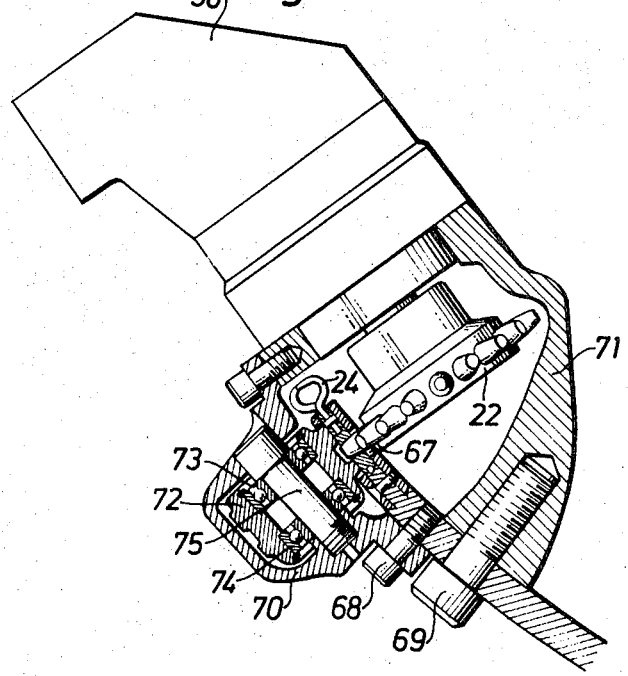
FIG. 13 is a cross section through driving means used in the embodiment in FIGS. 9–12.

One of the driving mechanisms is shown in more detail in FIG. 13. A short section of the edge portion of the bowl 54 is enclosed in a casing composed of an outer part 70 secured by screws 68 and an inner part 71 secured by screws 69. The inner part 71 carries the motor 38 and the tooth wheel 22, while the outer part 70 of the casing encloses a roller 72 which is journalled on a shaft 75 by means of two ball bearings 73, 74. Through an opening in the outer guide ring 62 this roller 72 is in contact with the outer side of the saw ring 65 opposite to the tooth wheel 22 so as to serve as a counter support whereby the friction is reduced. Of course, lubricant must be supplied between the saw ring 65 and the inner surfaces of the guide rings 62, 63, but means required for that purpose may be conventional and need not be described.

What I claim is:

1. A tree felling device adapted to be suspended in a crane beam carried by a vehicle, comprising a ring formed as an annular segment of a spherical bowl and provided with saw teeth along its greater periphery, said teeth constituting a continuation of the profile of the bowl and having their edges directed peripherically, means for rotating said ring around its axis, and means for pivoting the ring a limited angle around the centre of an imagined sphere in which the bowl is included.

2. A tree felling device as claimed in claim 1, in which the ring is pivotable on an axis extending through said centre substantially perpendicularily to the axis of rotation of the ring.

3. A tree felling device as claimed in claim 1, in which the ring is carried by a supporting member stationary in relation to the ring, and a motor carried by said supporting member is connected to a tooth wheel engaging a peripheral row of bores in the ring.

4. A tree felling device as claimed in claim 1, in which the saw teeth are secured in a groove in the outer end surface of the ring.

5. A tree felling device as claimed in claim 3, in which the supporting member consists of an arcuate casing surrounding a section of the ring and in its interior provided with guide rollers arranged to engage the ring at both sides.

6. A tree felling device as claimed in claim 1, in which the ring is journalled at the edge of a spherical bowl having the same curvature, said bowl being pivotably suspended in a crane beam.

7. A tree felling device as claimed in claim 6, in which the ring is guided in a groove in the edge portion of the bowl.

8. A tree felling device as claimed in claim 7, in which the driving tooth wheel engages the bores in the ring through an opening in one wall of the guide groove, and the opposite wall of said groove has another opening, through which a roller engages the ring to serve as a counter support to the tooth wheel.

9. A tree felling device as claimed in claim 1, in which the saw teeth have a width at least equal to the wall thickness of the ring.

* * * * *